UNITED STATES PATENT OFFICE.

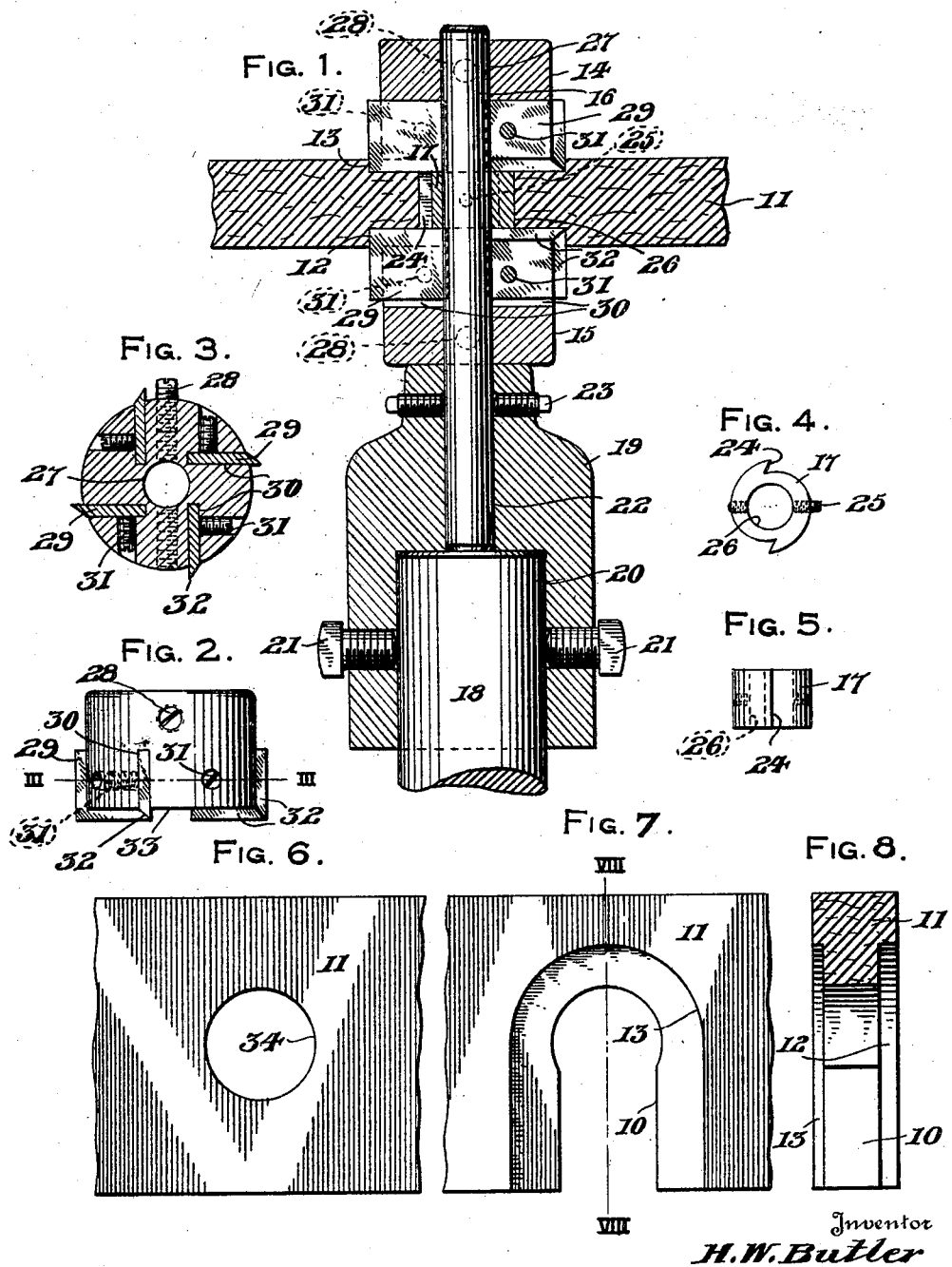

HIRAM W. BUTLER, OF ELMIRA, NEW YORK.

DOUBLE ADJUSTABLE MORTISE-CUTTER.

1,323,828.  Specification of Letters Patent.  Patented Dec. 2, 1919.

Application filed February 8, 1918. Serial No. 216,017.

*To all whom it may concern:*

Be it known that I, HIRAM W. BUTLER, a citizen of the United States, residing at Elmira, in the county of Chemung and State of New York, have invented certain new and useful Improvements in Double Adjustable Mortise-Cutters, of which the following is a specification.

This invention relates to certain new and useful improvements in double adjustable mortise cutters.

The primary object of the invention is the provision of a cutter head whereby a slot and a plurality of mortises may be quickly cut simultaneously for such purposes as the mounting of locks, hinges and catches.

A further object of the invention is the provision of a cutter head capable of making three separate cuttings in a single operation such as a receiving slot and opposite mortises or grooves of different depth if desired, the device being readily attached for operation upon the arbor or spindle of any boring, drilling or similar machine.

A still further object of the device is the provision of a cutter head for making a groove and double mortise in a board arranged with adjustable parts, possessing great strength and utility and being easy and inexpensive to manufacture.

With these general objects in view and others that will appear as the nature of the invention is to be understood, the same consists in the novel construction, combination and arrangement of parts hereinafter fully described, illustrated in the accompanying drawing and then claimed.

In the drawing forming a part of this application and in which like designating characters refer to corresponding parts throughout the several views:—

Figure 1 is a central longitudinal sectional view taken through the device operatively mounted upon an arbor and illustrated in the cutting operation;

Fig. 2 is a side elevational view of one of the cutter heads employed;

Fig. 3 is a sectional view thereof taken upon line III—III of Fig. 2;

Fig. 4 is an end view of a rotary cutter or saw employed with the device;

Fig. 5 is a side elevation thereof;

Fig. 6 is a plan view of a piece of board provided with a circular opening ready to be operated upon by my device;

Fig. 7 is a view thereof with the slot and mortise cut into the same; and

Fig. 8 is a sectional view through the tail upon line VIII—VIII of Fig. 7.

My device is primarily adapted for cutting a slot such as 10 in the edge of a piece of wood 11 and simultaneously cutting mortises 12 and 13 of desirable depth upon opposite sides of the board marginally of the slot therein. For doing this work, the invention broadly consists of two cutter heads 14 and 15 adjustably secured in spaced relations upon a suitable mounting spindle 16 with a toothed rotary cutter or saw 17 secured to the spindle positioned between the said heads.

The spindle 16 may be readily positioned in a bit or drill machine chuck, not shown, or attached to any revolving arbor or shaft such as 18 by means of a connector 19. A socket 20 in one end of the connector 19 is adapted to receive the free end of the shaft 18 while bolts 21 secure the connector upon the shaft. A bore 22 of the connector receives the spindle 16 therein while bolts 23 retain the spindle within the said bore.

The rotary cutter 17 may be of any desired form having sufficient length to cut through the desired thickness of board 11 and herein illustrated as provided with two cutting teeth 24 while the cutter is secured at a desired point upon the spindle 16 by means of bolts 25 radially threaded through the cutter 17 for engaging the spindle when the cutter is mounted upon the latter with the spindle arranged through the central longitudinal opening 26 of the cutter.

Each of the cutter heads 14 and 15 is of similar cylindrical form provided with an axle bore 27 by means of which the head is mounted upon the spindle 16. Radially arranged locking screws 28 extend through the heads 14 and 15 and engage the spindle 16 for locking the heads upon the spindle.

Flat cutting blades 29 are adjustably arranged within recesses 30 of the said heads being retained therein by set screws 31 with the adjacent sharpened edges 32 at the outer corners of the blades 29 projecting suitable distances from the periphery of the carrying head.

The heads 14 and 15 are adapted for oppositely positioning upon the spindle 16 with the blades 29 projecting inwardly toward each other in contact with the intermediately positioned saw 17 when the device is operatively assembled as illustrated in Fig. 1 of the drawing.

It will be evident that upon revolving the spindle 16 for turning the saw and cutter heads, opposite mortises 12 and 13 and an intermediate slot 10 will be cut by the blades 29 and saw 17 respectively when the device is moved into contact with the work.

It will be seen that the adjacent circular faces or ends 33 of the heads 14 which are provided with the recesses 30 will be arranged a suitable distance apart to accommodate the thickness of work 11 being operated upon, while the blades 29 of the said heads 14 and 15 may project different desirable distances from the faces 33 for cutting the mortises 12 and 13 to the desired depth. The blades 29 may be also adjusted to project desirable distances from the peripheries of the heads 14 and 15 for cutting the mortises 12 and 13 of the desired width so that the said mortises may be formed of different widths at the opposite sides of the board 11. A circular opening 34 may be first bored through the wood 11 by a suitable implement, not shown, if desired and the slot 10 sawed through the board to communicate with the said opening while the inner ends of the mortises will surround the opening 34.

When the cutter heads and saw are arranged as herein shown mounted together upon the spindle 16 a slot and double mortise may be quickly cut into the board 11 for such purposes as the mounting of a lock upon the edge of the board but it will be understood that a single mortise may be formed by removing the outer end 14 and the saw 17 from the spindle 16 and moving the head 15 to the free end of the spindle with the cutting edges 32 of the blades 29 projecting forwardly thereof. It will be also evident that a single mortise and slot may be simultaneously formed in the board 11 by removing either one of the cutter heads 14 or 15 and then employing the other cutter head for making the mortise in the side of the board while the saw 17 cuts the slot in the edge of the board. It will be also understood that the blades 29 of the heads 14 and 15 are arranged for cutting when the spindle 16 is revolved in a certain direction but it will be evident that by interchanging the heads 14 and 15, the device will cut in a similar manner when the direction of rotation of the spindle 16 is reversed. In this way, the double mortise cutter is readily arranged for either a right or left hand machine.

My device is not limited for employment with any special machine but may be used upon any revolving shaft and may be adapted for employment upon a shaper and while the embodiment of the device herein set forth is believed to be preferable, it will be understood that minor changes may be made therein without departing from the spirit and scope of the invention as claimed.

What I claim as new is:—

A double adjustable mortise cutter comprising a spindle, a pair of cylindrical cutter heads slidably mounted on said spindle, means extending transversely through the heads and engaging said spindle to retain the heads in fixed relation thereon, a plurality of spaced cutter blades removably secured to each head, said blades having their cutting edges extending beyond the periphery and opposing ends of said heads, a cylindrical cutter removably secured to said spindle between and in engagement with the blades of said first heads, said cutter being of a diameter smaller than said heads and located wholly within the plane thereof and an operating means for said spindle to rotate said heads and cutter.

In testimony whereof I affix my signature.

HIRAM W. BUTLER.